Aug. 15, 1939  H. F. SMITH  2,169,746
REFRIGERATING APPARATUS
Filed June 30, 1936
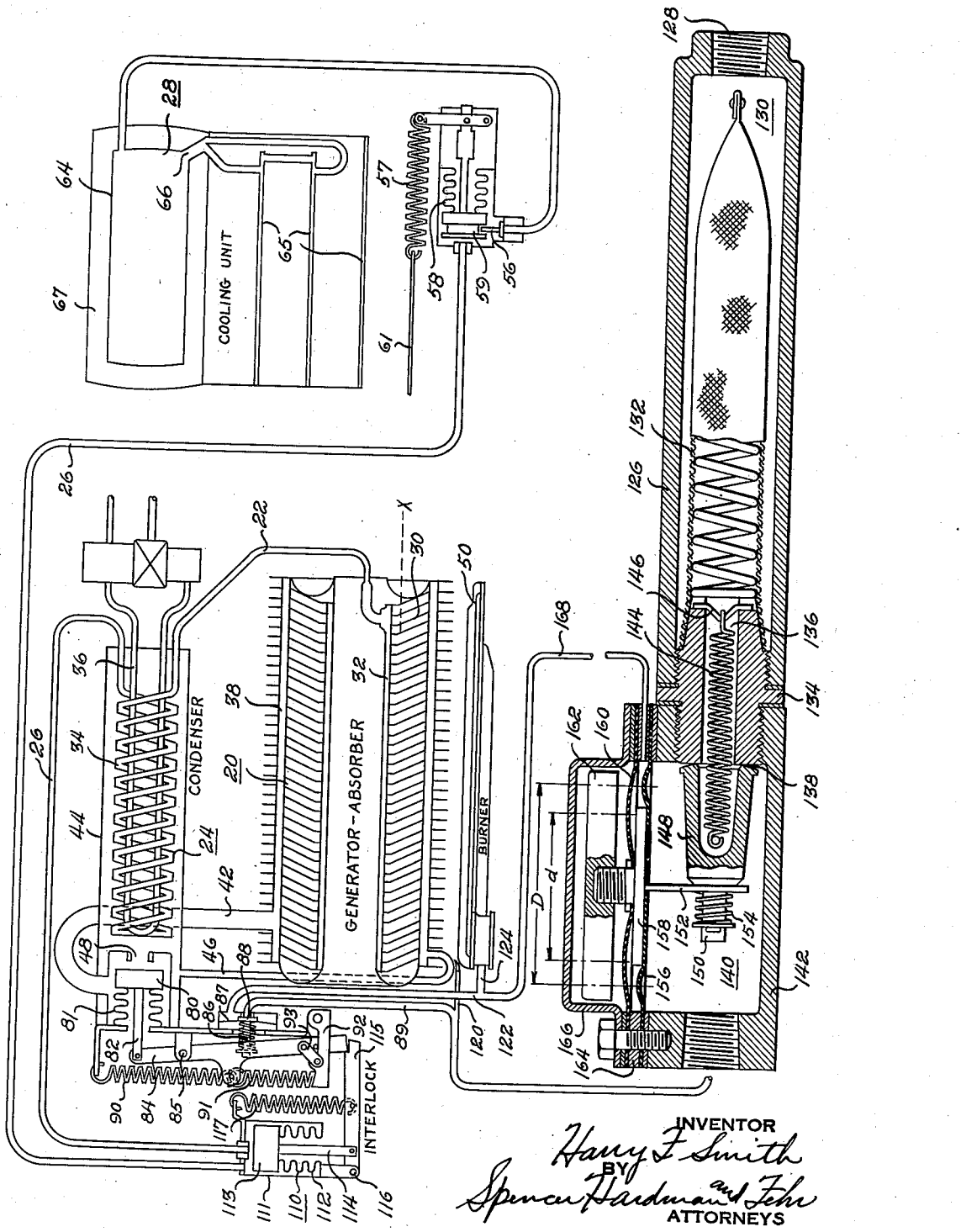
INVENTOR
Harry F. Smith
BY
Spencer Hardman and Fehr
ATTORNEYS Patented Aug. 15, 1939

2,169,746

UNITED STATES PATENT OFFICE 2,169,746

REFRIGERATING APPARATUS

Harry F. Smith, Dayton, Ohio, assignor to General Motors Corporation, Dayton, Ohio, a corporation of Delaware Application June 30, 1936, Serial No. 88,153

7 Claims. (Cl. 158—115)

This invention relates to refrigerating apparatus and more particularly to heating means for intermittent absorption of refrigerating systems and other heating requirements.

In intermittent absorption refrigerating systems it is necessary to have a heating cycle during which the burner is lighted and a cooling cycle during which the burner is shut off. A pilot light is ordinarily provided for lighting the burner at the beginning of each heating cycle. Ordinarily, this pilot light burns continuously at a substantially constant rate, but difficulty has been encountered because of the fact that when the burner is turned on at the beginning of the heating cycle, there is usually a momentary drop in pressure of the fuel supply to the pilot light, often causing the pilot light to go out before the burner is lighted. This obviously is very objectionable, but this trouble is not confined to intermittent absorption systems but occurs in nearly all intermittently operated automatic control heating means. Of course, it is possible to prevent the pilot from going out by providing a pilot light of excessive size, but this is undesirable, particularly in intermittent absorption refrigerating systems.

It is an object of my invention to provide a controlled heating means wherein the pilot light is provided with a larger flame when the burner is turned on.

It is another object of my invention to provide an increased fuel supply for the pilot light when the burner is turned on.

Further objects and advantages of the present invention will be apparent from the following description, reference being had to the accompanying drawing, wherein a preferred form of the present invention is clearly shown.

In the drawing:

The figure is a diagrammatic illustration of an intermittent absorption refrigerating system provided with a heating and control means embodying my invention.

Briefly, I have disclosed an intermittent absorption refrigerating system of the solid absorption type provided with a vapor heating and cooling system which controls the supply of fuel to the main burner. This fuel supply of the main burner is further controlled by an interlock which prevents the beginning of a heating cycle until the refrigerant pressure within the generator-absorber has increased to a predetermined pressure. A pilot light is provided for lighting the burner. Both the pilot light and the main burner have their fuel supply controlled by a pressure regulating valve which provides an increased fuel pressure to both the pilot light and the main burner when the main burner is turned on.

Absorption refrigerating system

Referring to the drawing, there is shown a generator-absorber generally designated by the reference character 20, the interior of which is connected by a conduit 22 with the inlet end of a condenser 24. The outlet of the condenser 24 is connected by means of the conduit 26 with an evaporator 28. The absorber, shown diagrammatically, is constructed to permit the rapid transfer of heat to and from the absorbent material when the refrigerant is being released and absorbed. This heat transfer mechanism consists essentially of steel fins or pans indicated by the reference character 30 extending from the outside surface of the absorber to the center thereof, between which pans, powdered absorbent material is packed, for instance, by a centrifugal filling machine. An opening indicated by the reference character 32 passes through the center of these heat conducting fins or pans and provides a passage for the refrigerant gas into and out of the interior of the generator-absorber.

The condenser 24 is shown diagrammatically as consisting essentially of a coil of tubing, indicated by the reference character 34 through which the ammonia passes from the conduit 22 to the conduit 26. The refrigerant coil 34 is in intimate contact with a corresponding circulating water coil indicated by the reference character 36.

The apparatus so far described operates substantially as follows: When heat is applied to the generator-absorber from any source, the ammonia is liberated from the absorbent material within the generator-absorber. This liberated ammonia gas passes through the tube or conduit 22 to the condenser coil 34 where it gives off its heat to the cooling water and is consequently turned to a liquid. While condensation is taking place, the ammonia gas given off by the absorbent forces the condensed liquid ahead of it, up through the conduit 26 to the evaporator 28. After a complete charge of ammonia gas is driven out of the generator-absorber, the heating is discontinued and the generator-absorber is cooled. The cooling of the generator-absorber lowers the pressure within the system and the liquid refrigerant contained within the evaporator 28 evaporates, absorbing its latent heat of evaporation from the atmosphere immediately surrounding the evaporator 28. The vapors resulting from the evaporation of liquid refrigerant pass through the conduit 26, the condenser coil 34 to the generator-absorber 20, wherein they are absorbed with the liberation of heat by the solid absorber.

The means for heating and cooling the generator-absorber consist essentially of a closed circuit containing a volatile liquid, which volatile liquid is permitted to condense on the surface of the generator-absorber to provide for the ingress of heat to the generator-absorber during the generating period and to evaporate on the surface of the generator-absorber to remove heat therefrom during the refrigerating or absorbing period. By providing such a heating and cooling system, the generator-absorber is heated evenly, and hot spots occasioned by the use of a direct flame are avoided.

This heating and cooling means comprises a jacket indicated by the reference character 38 provided around the generator-absorber. This jacket 38 is connected by a vapor conduit 42 to a corresponding jacket 44 located around the condenser coil 34 and the water coil 36. The lower end of the jacket 44 surrounding the condenser 24 is connected by means of a tube 46 to the lower end of the jacket 38. A valve passage 48 controlled by the movable valve disc or the plunger 80 is provided in this closed fluid circuit, which valve is closed during the heating cycle as also more fully described hereafter.

The closed circuit comprising the heating and cooling system, contains a quantity of a low boiling heat transfer fluid such as monofluorotrichloromethane (CCl₃F). Sufficient fluid is contained in the circuit to surround the generator-absorber. At the start of the generating period, the gas is turned on at the burner 50 and at the same time the vapor valve 48 is closed in a manner that will be fully described hereinafter. The heating of the absorber jacket 38 will cause part of the heat transfer liquid contained therein to vaporize and the pressure generated above the liquid level in the jacket 38 will force the liquid in the jacket 38 out through the liquid tube 46 up into the condenser jacket 44 completely filling the condenser jacket 44 and the liquid tube 46 and leaving a liquid seal across the opening of the liquid tube in the bottom of the generator-absorber jacket 38. In other words, the level of the heat transfer liquid in the absorber jacket will be lowered down to approximately the line indicated by the reference character X. Further vaporization of the liquid within the generator-absorber jacket 38 will cause the vapors to condense on the surface of the generator-absorber, giving up heat of the condensation to the absorbent material therein.

The heating of the generator-absorber continues until a complete charge of ammonia gas has been driven out of the absorbent material, at which time the gas burner is turned off and the vapor valve 48 is automatically opened in a manner fully described hereinafter.

When the vapor valve 48 is opened, the hot vapor rises from the top of the generator-absorber jacket 38 through the conduit 42 into the relatively cool condenser 24 wherein it condenses to a liquid. At the same time, that is, when the valve opens, the flow of heat transfer liquid which has been stored in the condenser jacket during the generating period drains by gravity back through the liquid conduit 46 to completely submerge the generator-absorber. Thus, during the absorption period a cold liquid bath is provided around the absorber structure.

As soon as the absorber is cooled by this liquid transfer agent, the absorbent material therein immediately starts absorbing the ammonia gas resulting from the evaporation of liquid refrigerating in the evaporator. The absorption of the refrigerating gas in the absorber liberates large quantities of heat known as the heat of absorption or heat of chemical combination, as well as the heat extracted from the cabinet or fluid to be cooled by the evaporation of liquid refrigerant within the evaporating means 28. This heat is given off through the cold liquid contained in the generator-absorber jacket 38 causing the vaporization of the liquid heat transfer agent. This heat laden vapor then passes up through the vapor tube 42 and through the valve 48 to the condenser 24 where it is condensed by contact with the water coil 36. The liquid then passes by gravity down through the liquid tube 46 to again enter the generator-absorber jacket 38 wherein it absorbs more heat and the vaporization process is repeated. This process continues until a complete change of ammonia is re-absorbed, at which time the heat is automatically started and the vapor valve is automatically closed in a manner fully described hereinafter.

Thus, it will be seen that the generator-absorber is first heated uniformly by the condensation of vapor generated in the generator-absorber jacket and then cooled evenly by the immersion of the absorber in a body of liquid heat transfer agent during the refrigerating or absorbing period.

During the generating period, when the ammonia gas is being driven from the generator-absorber, it becomes necessary to provide means for preventing condensation of the ammonia gas in the evaporator instead of in the condenser, for obviously, condensation will initially take place in the coldest part of the system. Since the evaporator has been maintained during the refrigerating cycle, at a substantially low temperature, condensation will take place in the evaporator in preference to the condenser unless some means is provided to prevent such condensation. Condensation in the evaporator must be prevented, otherwise large quantities of heat in the form of condensation will be dissipated to the compartment of fluid that is supposed to be cooled.

To prevent the ingress of heat to the evaporator or to prevent the condensation of ammonia within the evaporator, there is provided in the liquid line 26 a valve 56 somewhat on the order of a check valve, and means are provided for opening the valve 56 only after a pressure has been reached within the condenser which assures complete condensation of the refrigerant within the condenser. During the generating period, as ammonia gas is being driven through the conduit 22, the condenser 34 and the liquid line 26, the pressure of the gas plus the weight of the valve 56 will hold the valve 56 closed, thus preventing any of the hot gas from entering the evaporator 28. The pressure of ammonia gas in the condenser 34 then gradually builds up to a point where the gas starts to condense in the condenser to liquid ammonia. Now, inasmuch as the space for liquid ammonia in the condensing coil is small, it is soon filled with liquid. The condenser pressure again starts building up until a certain pressure is reached sufficient to overcome the bellows indicated by the reference character 58, thereby causing a movement of the plunger 59 to the right against the tension of the spring 57. This movement of the plunger 59 will tip the liquid valve off its feet in a manner that will be obvious from the drawing, and allow the liquid ammonia to flow to the evaporator 28. This process continues intermittently, opening and closing the valve 56 until the complete charge of ammonia liquid is driven out of the condenser and stored in the evaporator. Thus, the valve 56 functions to prevent the passage of hot gas to the cold evaporator.

While the valve 56 prevents the ingress of hot gas to the evaporator, it does permit the passage of liquid thereto and since the liquid refrigerant is cooled only to approximately the temperature of the cooling water used for cooling the condenser, some means must be provided for preventing the heat given off from the liquid refrigerant from warming up the cabinet. This is accomplished in two ways.

In the first place, the top or cylindrical part 64 of the evaporator 28 is connected to the bottom or plate part 65 of the evaporator in only one place 66 and the bottom plates are so constructed as to remain full of cold liquid at all times, thereby leaving a liquid seal over the opening 66. This is accomplished by so regulating the initiation of the heating cycle that the generating period will begin before the entire charge of liquid ammonia is absorbed from the evaporator; thus, the bottom part of the evaporator is practically insulated from the top part and, therefore, no heat can be transmitted to the bottom plates of the cooling unit during the generating cycle.

Another feature is provided for preventing any heat in the top part of the evaporator from entering the cabinet or fluid to be cooled. This is accomplished by providing a jacket 67 around the cylindrical portion 64, said jacket containing a congealing liquid having a freezing point above which we do not want the evaporator temperatures to rise. This congealing liquid is frozen solid during the absorption or refrigerating period. Consequently, when the warm liquid ammonia starts flowing into the evaporator during the generating period, due to the opening of the valve 56, the heat contained in the liquid ammonia is immediately dissipated to the congealing liquid in the jacket 67 causing the melting or change in state of a small amount of the frozen congealing liquid without raising the temperature thereof. This latent heat is then stored in the congealing liquid until the following absorption period, when it is again removed and the liquid re-frozen. In this way the temperature of the evaporator is maintained at a substantially low point even during the generating period and provides refrigeration for the food compartment during that period.

I have also provided means in the form of a selective temperature regulating valve for maintaining substantially constant temperature within the evaporator during the refrigerating period. This temperature regulating means is disclosed in the form of a valve which is adapted to be opened and closed by means of the plunger 59 movable in response to the diaphragm or bellows 58 which diaphragm 58 is exposed to and influenced by the pressure within the evaporator 28. The pressure within the evaporator 28 required to open the valve 59 may be regulated by means of the spring 57 provided with a connection 61 to a regulator knob.

Suppose for instance that it is desired to maintain a temperature of substantially 25° F. within the evaporator, then the tension of the spring 57 is adjusted by means of the regulator knob to require a pressure in the evaporator corresponding to a temperature of 25° F. to contract the bellows 58. As the pressure within the evaporator falls to that predetermined point, the plunger 59 will move towards the valve seat, thereby throttling the flow of refrigerant gas from the evaporator to the absorber. The throttling of the flow of gas will retard the evaporation of liquid refrigerant within the evaporator 28. If the pressure within the evaporator falls below that predetermined point, then the valve will be entirely closed. On the other hand, if the pressure within the evaporator 28 rises above that predetermined pressure, the plunger 59 will move away from the valve seat, thereby permitting more rapid evaporation of liquid refrigerant in the evaporator 28. This temperature regulating valve therefore maintains the temperature of the evaporator at substantially any desired point and is termed a "selective temperature control."

In order to start and stop the generating and absorbing period automatically, it is necessary to arrange in some way for opening and closing the gas and vapor valve. In addition to this, it is also desirable to provide suitable means for determining when these valves shall be opened and when they shall be closed; in other words, when the heating period shall commence and when the heating period shall terminate.

*Burner control valve*

For automatic opening and closing of the gas and vapor valve, or, in other words, initiating and terminating the heating period, I have provided means responsive to the pressure within the heating and cooling systems. For instance, the vapor valve 48 is controlled by a plunger 80 operated by movement of the bellows 81, which bellows is in open communication with the interior of the heating and cooling system and, therefore, moves in response to varying pressures therein. A rod 82 has one end connected to the movable plunger and its other end pivoted to a lever 84, which lever is pivoted at 85 and carries a rod 86 connected to a valve disc or diaphragm 87 controlling the valve 88 in the gas or fuel line 89.

An upper spring 90 is connected to the lever 84 to oppose the opening of the vapor valve 48 and to give the entire system a bias tending to close the vapor valve 48 and tending to open the gas valve 88. Also connected to the lever 84 is a toggle snap acting mechanism including a lower spring 91 connecting the main control lever 84 and a short lever 92, and a toggle link 93 connecting the short lever 92 and the main control lever 84. The function of the toggle mechanism including the lower spring 91 is to resist movement of the main control lever 84 in either direction until the accumulated pressure has reached a stated amount and then to insure complete movement from one position to the other position after the movement is started in either direction. This insures the complete opening or the complete closing of the vapor valve 48 and the gas valve 88.

Assuming that the generator-absorber 20 is being heated, or in other words, that the generating cycle is taking place, the valve 48 is closed by means of the movable plunger 80 and the gas valve 88 is opened, these valves being held in this position by the spring 90. Towards the end of the generating period after a complete charge of ammonia has been driven out of the absorbent material within the generator absorber, the temperature and pressure of the heat transfer vapor within the jacket 38 surrounding the generator-absorber will rise abnormally or very rapidly, due to the fact that no more heat is being taken out from the heat transfer liquid for the purpose of driving out refrigerant from the absorbent material. When the pressure of the vapor within the heating and cooling system reaches a point where the force exerted by it is greater than the force exerted by the control spring 90 and the toggle spring 91 which tend to hold the vapor valve shut, the bellows 81 will collapse, moving the plunger 82 rapidly to the left under the control of the toggle mechanism, thereby pivoting the lever 84 counter-clockwise to open the valve 48 and simultaneously move the diaphragm 87 to a position to close the valve 88. This position is shown in the figure.

The absorption or refrigerating cycle then starts as heretofore described, because the cool heat transfer liquid contained in the condenser jacket 44 drains around the generator-absorber, thus cooling the absorbent and lowering the pressure within the entire refrigerating system. This reduction in pressure within the ammonia system causes the liquid ammonia in the evaporator 28 to evaporate and produce refrigeration in the usual manner. The pressure of the heat transfer vapor within the heating and cooling system is also reduced as soon as the gas flame is shut off and the vapor valve is opened. When the vapor pressure of the liquid within this heating and cooling system is reduced to a point where the forces exerted by it on the bellows 81 are so small that the force exerted in the opposite direction by the control or loading spring 90 is sufficient to overcome the resistance of the toggle mechanism, the spring 90 will close the vapor valve 48 and open the gas valve 88. In other words the opening and closing of the vapor valve 48 permitting the circulation of the heat transfer liquid within the heat transfer circuit are directly controlled by the pressure within the heat transfer circuit.

While it is advisable that this use of the varying pressures within the heat transfer circuit to initiate and terminate the heating and cooling cycles, these conditions cannot be relied upon alone to determine whether the proper time has arrived for initiating one cycle and terminating the other cycle. For example, if the cooling water used for cooling the condenser is abnormally low in temperature, then the pressure within the heat transfer cycle may fall low enough to start a heating cycle before a complete charge of refrigerant has been absorbed. Also, where conditions are such that but a small amount of refrigeration is required within the evaporator, due for example to a low temperature of the surrounding atmosphere, absorption may be so slow as to cause undue low pressure within the heating and cooling circuit. In either of these cases, what is known as short cycling may take place unless some means are provided for preventing the operation of the lever mechanism for starting a heating cycle until the full charge of refrigerant has been absorbed.

To accomplish this end, the apparatus is provided with what is termed an "interlock". This interlock is indicated generally 110 and comprises a casing 111 connected directly into and forming a part of the refrigerant line or conduit 26. This casing 111 encloses a bellows 112 connected at one end to the casing and at its other end to a plunger 113. To the plunger 113 and within the bellows 112 is connected a rod 114 having its other end connected to lever or latch 115 pivoted to the casing at 116. The exterior of the bellows 112 is exposed to refrigerant pressure and the movement of the bellows is opposed by the spring 117 secured at one end to the casing 111 and at its other end to the lever 115. At the end of the lever 115, there is provided a notch adapted to engage the end of the lever 84 for a purpose hereinafter fully described.

Assume now that the refrigerating or absorption cycle is under way, then the pressure within the refrigerating system drops, causing the bellows 112 to expand, thereby moving the lever 115 counter-clockwise. The notch at the end of the member 115 thereby engages the end of the lever 84. The parts remain in this position since, regardless of how low the pressure may drop within the generator-absorber and the condenser, the operation of the lever 84 to open the gas valve 88 and to close the vapor valve 48 is prevented until the pressure within the refrigerating system rises above a certain predetermined point, thereby moving the lever 115 out of engagement with the lever 84. Under normal or ideal conditions such a rise in pressure does not take place until the desired complete full charge of refrigerant has been absorbed by the absorbent material, since under such conditions the rise in pressure to the tripping point indicates that the absorbent is approaching a saturated condition.

As mentioned before, the gas valve 88 shuts off the flow of gas to the burner at the end of the heating or generating cycle and turns on the flow of gas to the burner at the beginning of the heating cycle. In order to light the burner at the beginning of the heating cycle there is provided a pilot light 120 which is connected to the conduit 89 which conducts the gas to the gas valve 88. After the gas passes through the gas valve 88, it is conducted through the conduit 122 and the branch conduit 124 to the main burner 50.

*Pressure regulating valve*

Heretofore, a common pressure regulating valve has been provided for regulating the pressure of the gas supplied to the pilot light and to the gas valve which controls the flow of gas to the main burner. It has been found, however, that often the pilot light would go out at the time the gas valve 88 opened to supply gas to the main burner. It is undesirable to increase the pilot flame to avoid this because any heating during the absorption period is undesirable since the cooling of the generator-absorber is necessary to produce the refrigeration. Also, the pilot light would use more gas than was necessary.

In order to overcome this objectionable circumstance I have provided a pressure regulating valve which supplies gas under a pressure of about 1½ ounces when the gas valve 88 is in closed position, but when the gas valve is opened the pressure of the gas supplied to the pilot light and to the main burner is increased to about 2 ounces. This provides a greater pilot flame when the burner is lighted, thus preventing the pilot light from going out at this time. The pilot light is then made so that it burns just sufficient gas to keep lighted during the absorption cycle, while when the gas is turned on to the main burner an additional supply of gas to the pilot is provided so that the main burner may be readily lighted. It will be seen that this is of importance not only in an intermittent absorption refrigerating system, but in almost all automatically controlled burners.

In my improved regulating valve there is provided a cylindrical casing 126 having an inlet 128 at one end for receiving the gas and a chamber 130 provided with a filter 132. The end of the casing 126 opposite the inlet 128, is threaded onto a valve seat member 134 provided with a passage 136 leading from the interior of the filter member 132 to the valve seat 138 located within the chamber 140 in a casing 142 threaded onto the opposite end of the valve seat member 134. The valve seat member 134 receives a tension coil spring 144 anchored at one end to the anchor member 146 and at the opposite end to a tilting bell-shaped valve member 148. This valve member 148 operates somewhat similarly to the valve member 56. This valve member 148 is normally held on its seat by the tension coil spring 144.

At the end opposite the seat, the valve member 48 is provided with rounded end and a pin 150 projecting from the rounded end which receives the operating member 152. This operating member 152 is provided with an aperture threaded onto the pin 150 and held in place by a spring 154. The operating member 152 is connected through a diaphragm 156 of a rubber-like material to a disc 158 fastened to the opposite side of the diaphragm. This diaphragm is preferably made from a product of chloro-2-butadiene-1,3. Above the disc 158 is a second diaphragm 160 of similar material which is fastened at its center portion to the disc which in turn has a projection extending upwardly and provided with a weight 162 at the upper end. These diaphragms 156 and 160 are spaced by an annular member 164 and the upper diaphragm 160 and the weight 162 are enclosed by a cap member 166.

The lower diaphragm has an effective area of D while the upper diaphragm has an effective area of d. It is believed that it should be obvious that the diaphragm 156 has a considerably larger effective area than the diaphragm 160. In the diaphragm 156 the area covered by the disc 158 is 100% effective because it acts just like a piston. The portion of the diaphragm 156 between the edges of the disc and the points at which it is attached to the wall is only about 50% effective because one-half of this portion of the diaphragm exerts a pull against the wall while the other half is effective to operate as a diaphragm. In the upper diaphragm 160 only the center portion, where the center of the diaphragm is clamped, is 100% effective. Likewise, only one-half the remaining portion is effective because the other half of the remaining portion of the diaphragm exerts its force upon the points at which the edges of the diaphragm are attached. The chamber 140 is connected to the conduit 89 which leads to the pilot light 120 and to the gas valve 88. The chamber formed between the two diaphragms 156 and 160 is connected by the conduit 168 to the conduit 122 which conducts the gas to the main burner.

When the gas valve 88 is closed, pressure within the chamber 140 is maintained at approximately 1½ ounces. This pressure within the chamber 140 exerts an upward force upon the diaphragm 156 which has an effective area of D. The chamber between the diaphragms 156 and 160 is of atmospheric pressure because the gas valve 88 is closed and the burner permits the escape of any gas or fluid from the conduit 122 into the atmosphere, but there is an effective pressure of 1½ ounces upon the diaphragm 156 which is sufficient to balance the weight 162. Should this pressure fall slightly, the valve 148 will be tilted upon its seat by the operating member 152 and the weight 162 to raise the pressure to 1½ ounces. However, as soon as the pressure returns to 1½ ounces the diaphragm 156 will lift the weight to close the valve member 148 to prevent any further increase in pressure. The relation between the weight 162 and the effective area of the diaphragm 156 determines the pressure maintained.

The conditions change when the gas valve 88 is opened. Then the gas flows to the main burner and through the conduit 168 to the chamber between the diaphragms 156 and 160. This provides a substantially equal pressure on both sides of the diaphragm 156 acting to neutralize the effect of the pressure upon the diaphragm 156. Therefore, at this time the diaphragm 160 is the only pressure responsive means effective to control the operation of the valve. This diaphragm 160, however, has a considerably smaller effective area than the diaphragm 156 so that a considerably higher pressure must be reached before the valve 148 may be lifted to closed position.

Therefore, when the gas valve 88 is opened, gas or fuel at a higher pressure will be supplied to the pilot light 120 as well as to the main burner as soon as the gas valve 88 is opened. This prevents the pilot light 120 from going out when the main burner is turned on. A small throttling device may be provided at the inlet to the burner so that gas permitted to flow by the gas valve 88 will first be effective upon the diaphragms of the regulating valve 148 before the full amount of gas is supplied to the main burner 50.

While the form of embodiment of the present invention constitutes a preferred form, it is to be understood that other forms might be adopted, all coming within the scope of the claims which follow.

What is claimed is as follows:

1. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the pilot, said pressure regulating valve means having a diaphragm control means, said valve means including means for exposing one effective area of said diaphragm control means to the pressure of the fuel supply to the pilot and for exposing another effective area of said diaphragm control means to the burner pressure.

2. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the pilot, said pressure regulating valve means having a diaphragm control means, means for exposing an effective area of said diaphragm control means to the pressure of fuel supplied to the pilot, and a second diaphragm control means, and means for exposing an effective area of said second diaphragm control means to burner pressure.

3. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the pilot, said pressure regulating valve means having a diaphragm control means, and means for exposing an effective area of said diaphragm control means to the pressure of the fuel supplied to the pilot, and a second diaphragm control means, and means for exposing an effective area of said diaphragm control means to burner pressure to exert force to move the valve means in the same direction as the first diaphragm means upon an increase in pressure.

4. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the pilot, said pressure regulating valve means including wall means and a plurality of diaphragm means providing a chamber having two diaphragm means forming a portion of its walls and another chamber having a diaphragm means forming a portion of its walls, conduit means connecting said chamber having two diaphragms and said burner, and conduit means connecting said another chamber and said pilot, said diaphragm means of said chambers being operatively mechanically connected to the valve means to open and close the valve means.

5. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the burner, said pressure regulating valve means having a diaphragm control means, said valve means including means for exposing one effective area of said diaphragm control means to the pressure of the fuel supply to the pilot and for exposing another effective area of said diaphragm control means to the burner pressure.

6. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the burner, said pressure regulating valve means including wall means and a plurality of diaphragm means providing a chamber having two diaphragm means forming a portion of its walls and another chamber having a diaphragm means forming a portion of its walls, conduit means connecting said chamber having two diaphragms and said burner, and conduit means connecting said another chamber and said pilot, said diaphragm means of said chambers being operatively mechanically connected to the valve means to open and close the valve means.

7. A heating means including a burner, a pilot for lighting the burner, conduit means for conducting fuel to the pilot and to the burner, valve means for controlling the flow of fuel to the burner independently of the pilot, pressure regulating valve means for regulating the pressure at which the fuel is conducted to the pilot, said pressure regulating valve means having a diaphragm control means, said diaphragm control means having two different effective areas of different size, said valve means including means for exposing one effective area of said diaphragm control means to the pressure of the fuel supply to the pilot, and another different effective area to the burner pressure, said different effective areas of said diaphragm means being connected to operate a valve means in the same direction upon an increase in pressure applied thereto, said diaphragm means having a third effective area equal to but counteracting the effective area exposed to burner pressure, said valve means including means for exposing said third effective area to burner pressure.

HARRY F. SMITH.